United States Patent
Chen

(10) Patent No.: US 8,661,938 B1
(45) Date of Patent: Mar. 4, 2014

(54) PEDAL FOR A BICYCLE

(71) Applicant: Chung-I Chen, Taichung (TW)

(72) Inventor: Chung-I Chen, Taichung (TW)

(*) Notice: Subject to any disclaimer, the term of this patent is extended or adjusted under 35 U.S.C. 154(b) by 0 days.

(21) Appl. No.: 13/655,435

(22) Filed: Oct. 18, 2012

(51) Int. Cl.
*B62M 3/00* (2006.01)

(52) U.S. Cl.
USPC ........................................... 74/594.6

(58) Field of Classification Search
USPC ............... 74/560, 594.1, 594.4, 594.6
See application file for complete search history.

(56) References Cited

U.S. PATENT DOCUMENTS

| | | | | |
|---|---|---|---|---|
| 6,112,620 A * | 9/2000 | Chen | | 74/594.6 |
| 6,128,973 A * | 10/2000 | Nagano | | 74/594.6 |
| 6,170,357 B1 * | 1/2001 | Chen | | 74/594.6 |
| 6,324,941 B1 * | 12/2001 | Ho | | 74/594.6 |
| 6,490,948 B2 * | 12/2002 | Tanaka | | 74/594 |
| 7,024,962 B2 * | 4/2006 | Chen | | 74/594.6 |
| 2005/0005729 A1 * | 1/2005 | Chen | | 74/594.6 |
| 2007/0193402 A1 * | 8/2007 | Hsieh | | 74/560 |

* cited by examiner

*Primary Examiner* — Vicky Johnson

(57) ABSTRACT

A pedal for a bicycle includes an axial rod, a pedal body and two fastening assemblies which are mounted on the pedal body. The pedal body is assembled to the axial rod and having an upper portion and a bottom portion, and a first locking member and a second locking member. The first locking member and the second locking member are both located between the upper portion and the bottom portion. The two fastening assemblies are assembled to the first locking member and the second locking member respectively. Under this arrangement, each fastening assembly is assembled to the pedal body directly rather than be assembled to a further pedal as the prior art, so that the pedal for a bicycle of the present invention is lighter than the conventional pedal.

6 Claims, 9 Drawing Sheets

PEDAL FOR A BICYCLE

BACKGROUND OF THE INVENTION

1. Field of the Invention

The present invention relates to a pedal, and more particularly to a pedal for a bicycle.

2. Description of Related Art

When a bicycle rider is riding on a bicycle, he/or she has to alternatively and repeatedly tread on two pedals of the bicycle with his/or her legs so as to drive the bicycle to move forward. However, when the bicycle rider rides on an bumpy road or when the bottoms of the shoes of the bicycle rider is too slippery, the legs of the bicycle rider would unexpectedly depart from the pedals, and his feet would be hurt by the impact of the pedals. This is particularly a serious condition in a bicycle racing contest.

A conventional bicycle pedal set comprises two pedal bodies, a driving assembly and a braking system. The two pedal bodies are respectively pivoted on two cranks of a bicycle. Each pedal body comprises a controlling member and an engaging member. The controlling member drives the engaging member so that the engaging member is selectively positioned in one of an engaging state and a releasing state. The driving assembly drives the two controlling members of the two pedal bodies. The braking system connects the driving assembly, a front wheel brake lever of the bicycle, a rear wheel brake lever of the bicycle, and two brakes of the bicycle. Under this arrangement, when the rear wheel brake lever is not pressed, the engaging members are positioned in the engaging state; in contrast, when the rear wheel brake lever is pressed, the braking system drives the driving assembly so as to drive the controlling members of the pedal bodies; as a result, the engaging members are positioned in the releasing state by the controlling members.

However, the conventional bicycle pedal set has a disadvantage as following.

The conventional bicycle pedal set is heavier than another bicycle pedal set without the engaging member. Actually, weight reduction is recently an important topic for improving the performance of the bicycle.

The present invention has arisen to mitigate and/or obviate the disadvantages of the conventional.

SUMMARY OF THE INVENTION

The main objective of the present invention is to provide a pedal.

To achieve the objective, a pedal for a bicycle comprises an axial rod which is locked on a crank, a pedal body and two fastening assemblies which are respectively mounted at two sides of the pedal body, the pedal body rotatably assembled to the axial rod, the pedal body comprising an upper portion and a bottom portion, the pedal body having a first locking member and a second locking member respectively defined at two sides thereof, the first locking member and the second locking member both located between the upper portion and the bottom portion, the two fastening assemblies assembled to the first locking member and the second locking member respectively, each fastening assembly comprising a positioning member, an engaging member, a fastening member and a flexible controlling member, one fastening assembly assembled to the first locking member and one corresponding positioning member assembled to a top plane of the first locking member, each positioning member having two protruded rings respectively defined at two sides thereof, another fastening assembly assembled to the second locking member and another corresponding positioning member assembled to a bottom plane of the second locking member, the two positioning members being staggered, each fastening member assembled to each corresponding positioning member, each fastening member having an adjusting portion and two fastening portions which are defined at the two sides of the adjusting portion respectively, each fastening assembly further having a spindle, each spindle passing through each corresponding two protruded rings and each corresponding two fastening portions of each corresponding fastening assembly, so that each positioning member is connected to each corresponding fastening member, each flexible controlling member assembled between each corresponding positioning member and each corresponding fastening member, each flexible controlling member comprising two torsion springs, an abutting member and an adjustable bolt, each two torsion springs enclosing each corresponding spindle, each two torsion springs being symmetrical with each other, each torsion spring having an outer side formed at one end thereof, two outer sides of one pair of the torsion springs both abutted against the first locking member, another two outer sides of another pair of the torsion springs both abutted against the second locking member, each torsion spring having an inner side formed at another end thereof, a distance defined between two inner sides of each pair of the torsion springs, each abutting member abutting against the two inner sides of each corresponding two torsion springs from the pedal body, each adjustable bolt passing through each corresponding adjusting portion and each corresponding abutting member so that a user can screw the adjustable bolt to adjust a strength where each corresponding abutting member abuts against each corresponding two torsion springs, one engaging member having two ends assembled to the first locking member and another engaging member having another two ends assembled to the second locking member, each engaging member corresponding to each corresponding positioning member, the engaging member being U-shaped, a receiving space defined between each engaging member and each corresponding locking member. Wherein, two connecting grooves are defined at the top plane of the first locking member and the bottom plane of the second locking member respectively; a height difference is formed between the first locking member and the upper portion of the pedal body, and another height difference is formed between the second locking member and the bottom portion of the pedal body; each locking member has an arc concaved face formed at one side thereof; each arc concaved face corresponds to each corresponding two torsion springs; each connecting groove has a plurality of screwing holes opened at the bottom thereof; two spacing protrusions are protruded at the bottom plane of the first locking member and the top plane of the second locking member respectively; each spacing protrusion corresponds to each corresponding engaging member; each arc concaved face has two engaging grooves defined at two sides thereof; the two outer sides of each two torsion springs are both located into each corresponding engaging groove so that each two torsion springs are both positioned; each adjusting portion comprises an adjusting unit and a locking unit; each locking unit is extended downwardly from one side of each corresponding adjusting unit; each two fastening portions are formed at the two sides of each corresponding adjusting unit respectively; each two fastening portions are both parallel to each corresponding locking unit; each adjusting unit has a switching groove opened therethrough; each locking unit has a through hole opened thereon; each abutting member comprises an abutting portion; each abutting portion has an extruded block protruded from a top thereof; each abutting portion is abutted against two inner sides of each corresponding two torsion springs; each abutting portion has a threaded hole opened therethrough; the adjustable bolt passes through the through hole of the locking unit and the threaded hole of the abutting portion so as to adjust a distance between the abutting member and the locking unit of the adjusting portion so that the fastening member is adjustable; each extruded block is slidably assembled in to each corresponding switching groove; the pedal body has two side supports extended therefrom; the two side supports correspond to the first locking member and the second locking member respectively; the two side supports and the upper portion of the pedal body, and the two side supports and the bottom portion of the pedal body define an upper contacting face and a bottom contacting face respectively for the bicycle rider to tread on stably.

Further benefits and advantages of the present invention will become apparent after a careful reading of the detailed description with appropriate reference to the accompanying drawings.

DETAILED DESCRIPTION OF THE INVENTION

Figure 1:
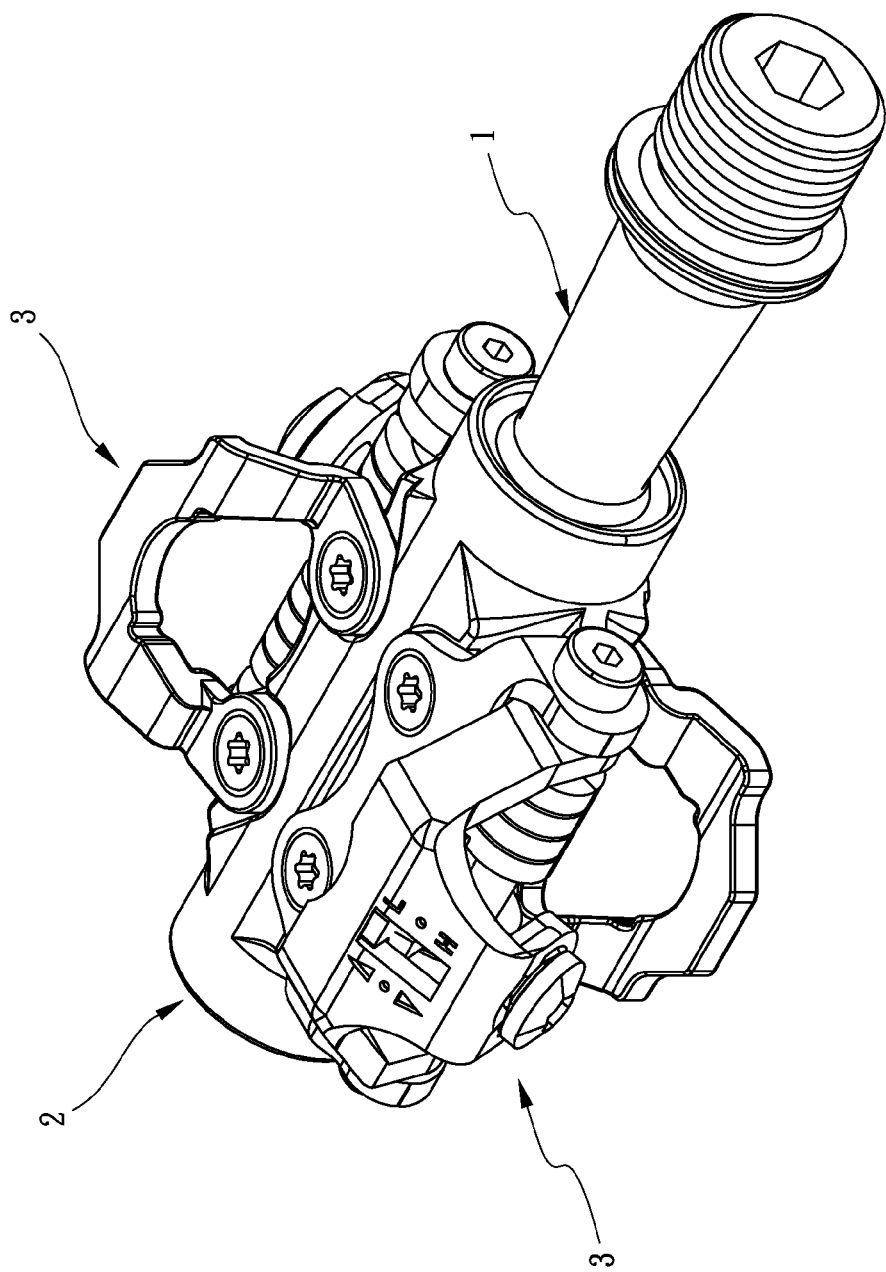
FIG. 1 is a perspective view of a first embodiment of a pedal for a bicycle of the present invention.
Figure 2:
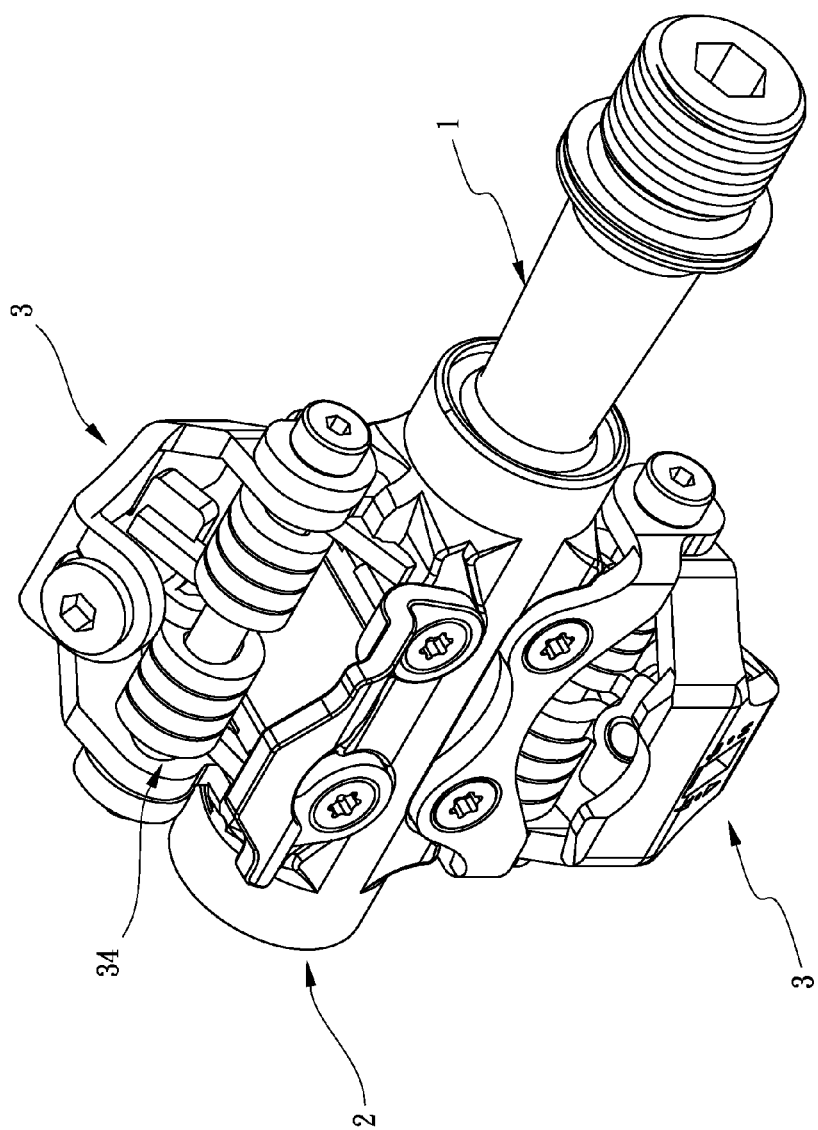
FIG. 2 is another perspective view of the first embodiment of the pedal for a bicycle.

Referring to FIGS. 1-5, a pedal for a bicycle in accordance with the present invention comprises an axial rod 1 which is locked on a crank (not shown), a pedal body 2, and two fastening assemblies 3 which are respectively mounted at two sides of the pedal body 2.

The pedal body 2 is rotatably assembled to the axial rod 1. The pedal body 2 comprises an upper portion 21 and a bottom portion 22. The pedal body 2 has a first locking member 23 and a second locking member 24 respectively defined at two sides thereof. The first locking member 23 and the second locking member 24 are both located between the upper portion 21 and the bottom portion 22.

The two fastening assemblies 3 are assembled to the first locking member 23 and the second locking member 24 respectively. Each fastening assembly 3 comprises a fastening device 30 and an engaging member 32, wherein the fastening device 30 includes a positioning member 31, a fastening member 33 and a flexible controlling member 34. One fastening assembly 3 is assembled to the first locking member 23 and the respective fastening device 30 is assembled to a top plane of the first locking member 23 via the respective positioning member 31. Each positioning member 31 has two protruded rings 311 respectively defined at two sides thereof. The other fastening assembly 3 is assembled to the second locking member 24 and the respective fastening device 30 is assembled to a bottom plane of the second locking member 24 via the respective positioning member 31.

Each fastening member 33 is assembled to each corresponding positioning member 31. Each fastening member 33 has an adjusting portion 331 and two fastening portions 332 which are defined at the two sides of the adjusting portion 331 respectively. Each fastening assembly 3 further has a spindle 4. Each spindle 4 passes through each corresponding two protruded rings 311 and each corresponding two fastening portions 332 of each corresponding fastening assembly 3, so that each positioning member 31 is connected to each corresponding fastening member 33.

Each flexible controlling member 34 is assembled between each corresponding positioning member 31 and each corresponding fastening member 33. Each flexible controlling member 34 comprises two torsion springs 341, an abutting member 342 and an adjustable bolt 343. Each two torsion springs 341 enclose each corresponding spindle 4. Each two torsion springs 341 are symmetrical with each other. Each torsion spring 341 has an outer side (not numbered) formed at one end thereof. Two outer sides of one pair of the torsion springs 341 are both abutted against the first locking member 23; another two outer sides of another pair of the torsion springs 341 are both abutted against the second locking member 24. Each torsion spring 341 has an inner side (not numbered) formed at another end thereof. A distance is defined between two inner sides of each pair of the torsion springs 341. Each abutting member 342 abuts against the two inner sides of each corresponding two torsion springs 341 from the pedal body 2. Each adjustable bolt 343 passes through each corresponding adjusting portion 331 and each corresponding abutting member 342, so that a user can screw the adjustable bolt 343 to adjust a strength where each corresponding abutting member 342 abuts against each corresponding two torsion springs 341.

One engaging member 32 has two ends assembled to the first locking member 23 and another engaging member 32 has another two ends assembled to the second locking member 24. Each engaging member 32 is corresponding to each corresponding positioning member 31. The engaging member 32 is U-shaped. A receiving space 321 is defined between each engaging member 32 and each corresponding locking member 23, 24.

Therefore, each fastening assembly 3 is assembled to the pedal body 2 directly rather than be assembled to a further pedal as the prior art, so that the pedal for a bicycle of the present invention is lighter than the conventional pedal.

Figure 3:
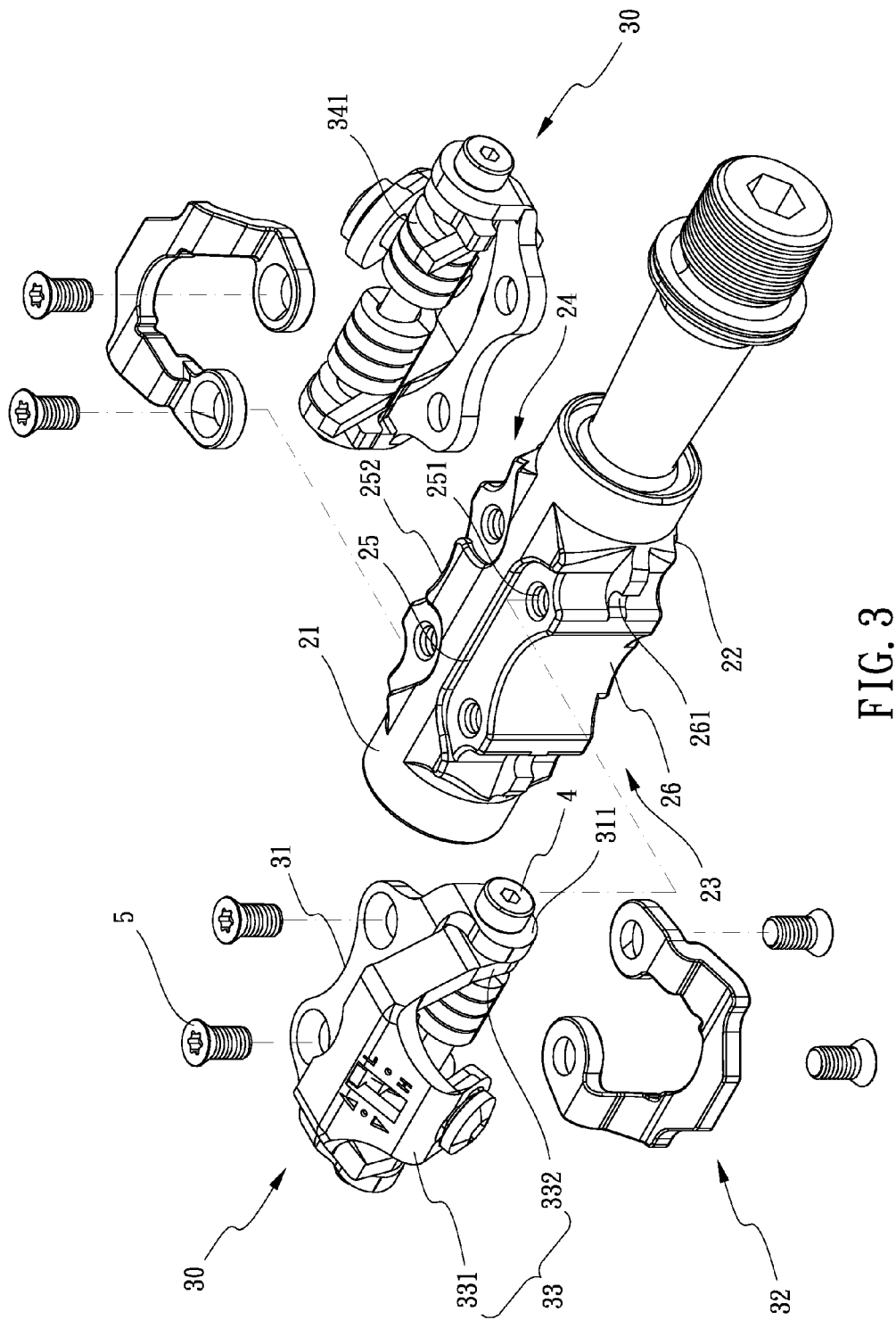
FIG. 3 is an exploded view of the first embodiment of the pedal for a bicycle.
Figure 4:
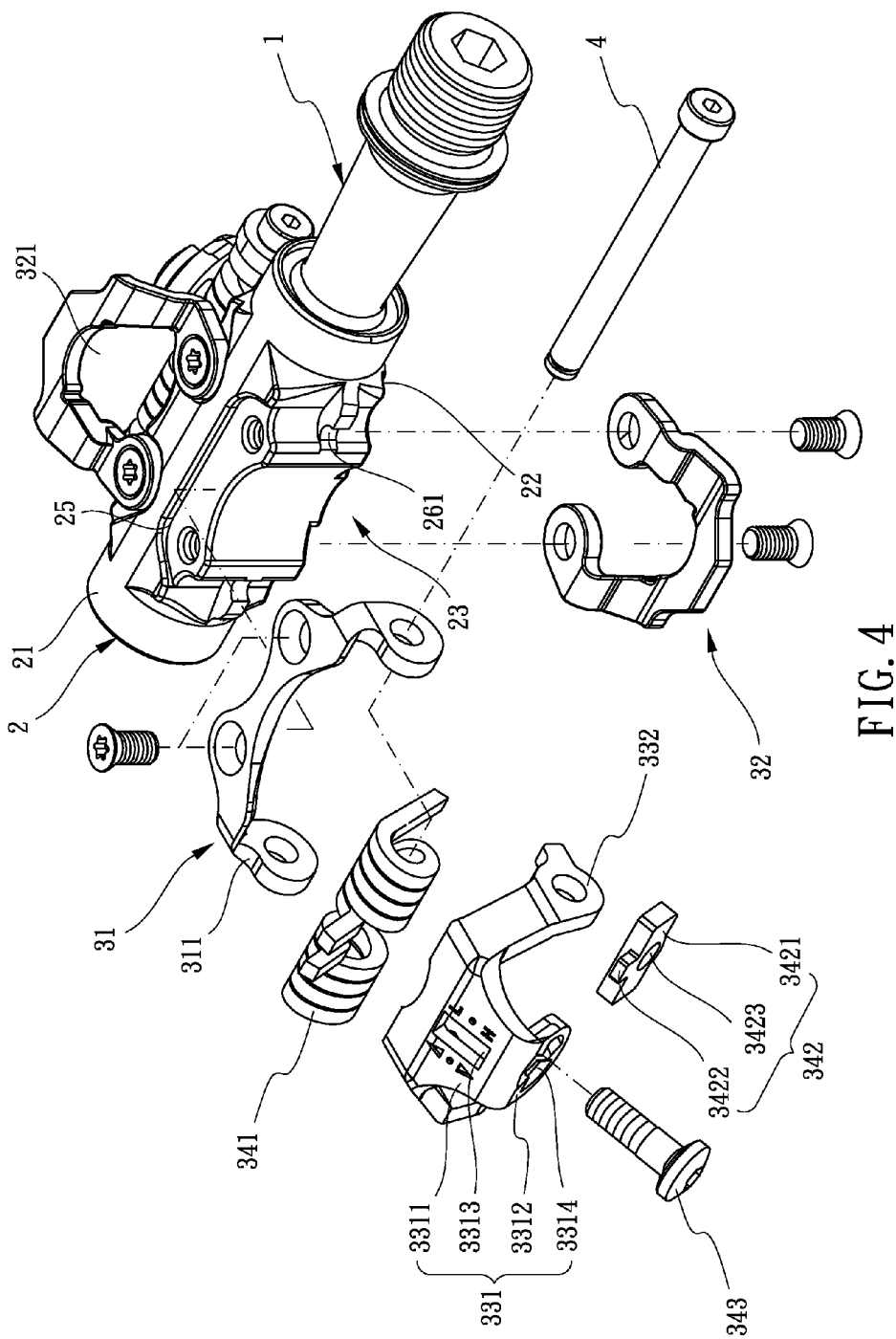
FIG. 4 is a partially exploded view of the first embodiment of the pedal for a bicycle.
Figure 5:
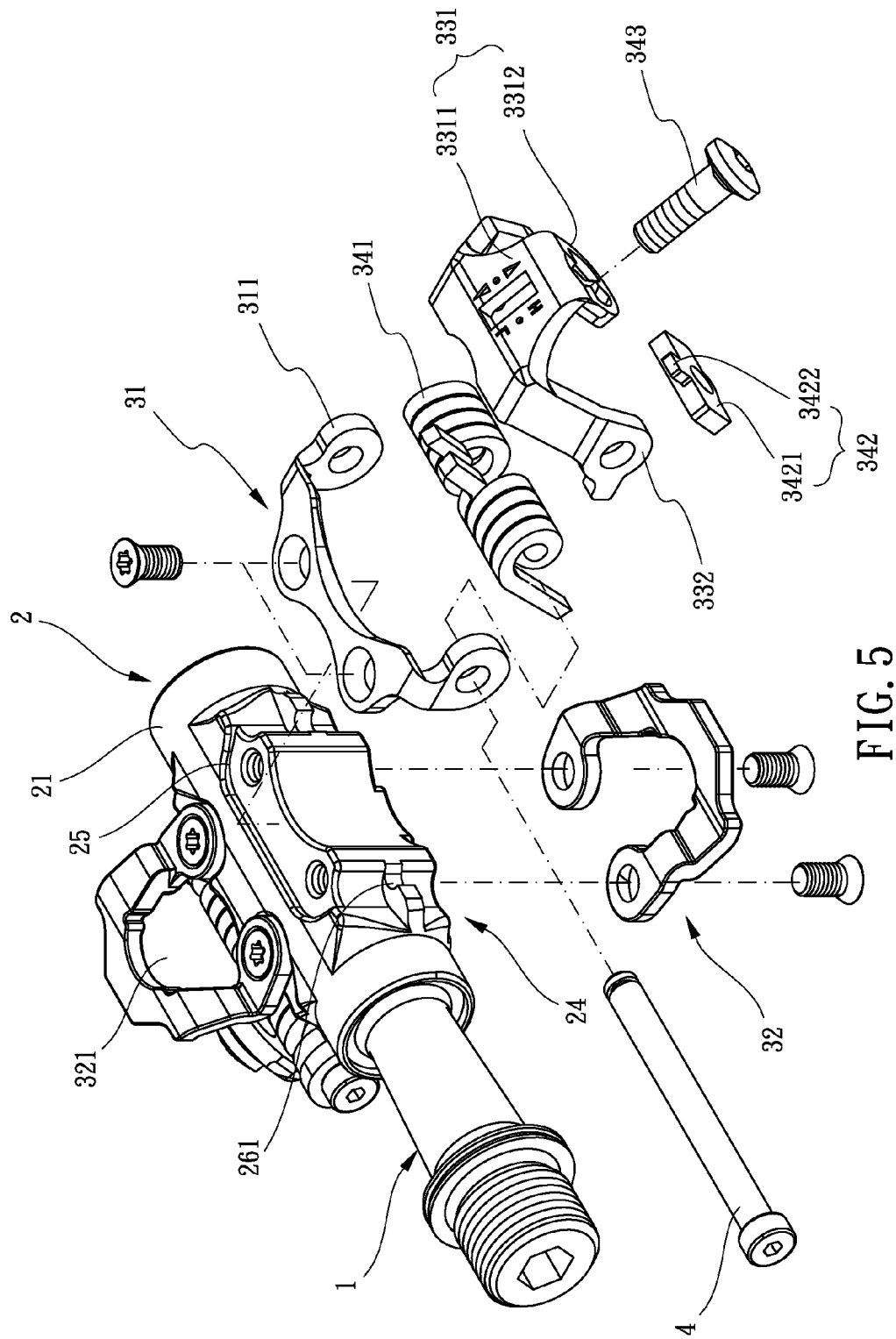
FIG. 5 is another partially exploded view of the first embodiment of the pedal for a bicycle.

Referring to FIGS. 3-5, two connecting grooves 25 are defined at the top plane of the first locking member 23 and the bottom plane of the second locking member 24 respectively, so that a height difference is formed between the first locking member 23 and the upper portion 21 of the pedal body 2, and another height difference is formed between the second locking member 24 and the bottom portion 22 of the pedal body 2. Each positioning member 31 is abutted against the bottom of each corresponding connecting groove 25. Each two protruded rings 311 of each corresponding positioning member 31 are extended outwardly relative to each corresponding connecting groove 25. Each connecting groove 25 has a plurality of screwing holes 251 opened at the bottom thereof. A plurality of fastening bolts 5 is used to lock the positioning member 31 on each corresponding connecting groove 25. The fastening bolts 5 pass through the positioning member 31 to respectively screw into the screwing holes 251.

Each fastening member 33 is assembled between the two protruded rings 311 of each corresponding positioning member 31 so that the two fastening portions 332 of each fastening member 33 are respectively abutted against the two protruded rings 311 of each corresponding positioning member 31. An angle is defined between each fastening member 33 and each corresponding positioning member 31. Two spacing protrusions 252 are protruded at the bottom plane of the first locking member 23 and the top plane of the second locking member 24 respectively. Each spacing protrusion 252 corresponds to each corresponding engaging member 32.

Figure 6:
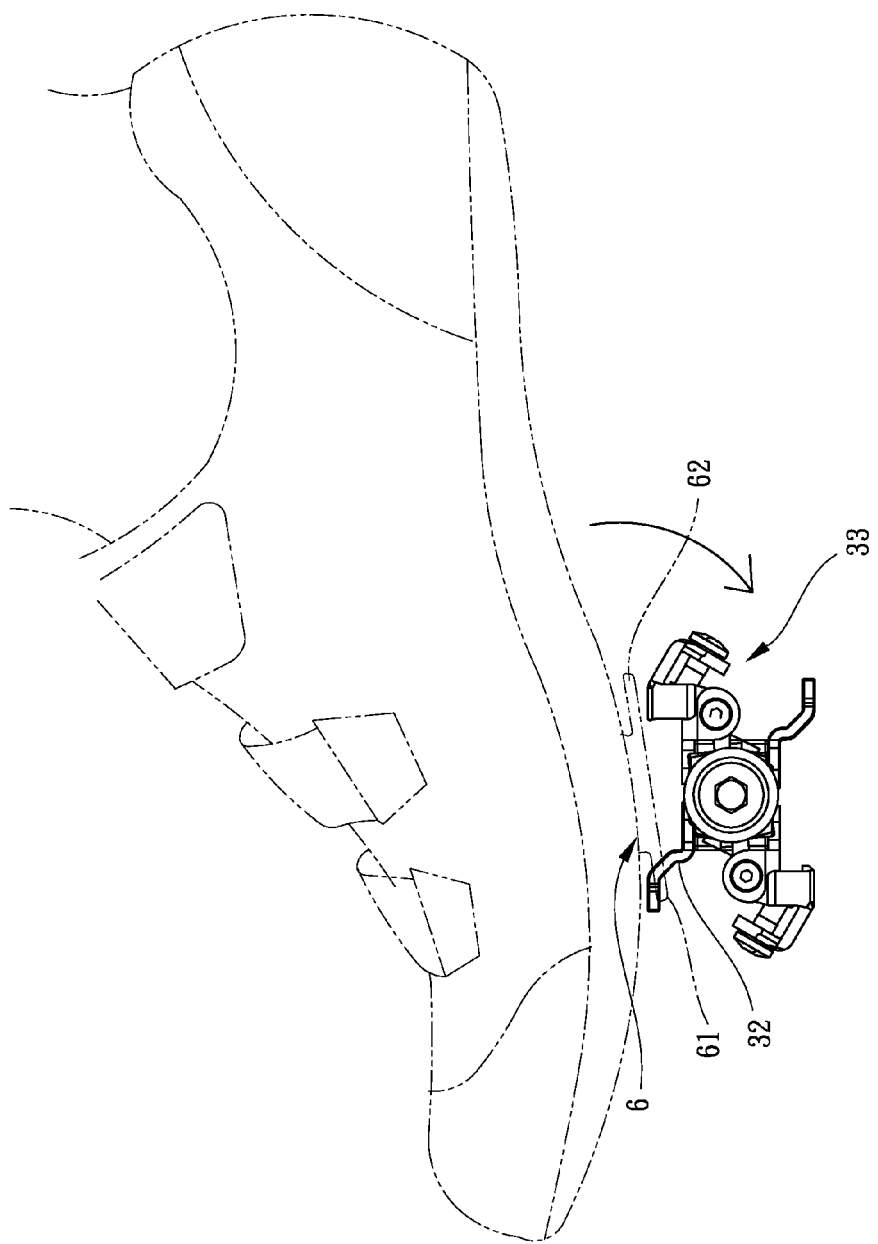
FIG. 6 is a side view for showing a front buckle of a shoe which is received into the receiving space and is engaged with the engaging member of the present invention.
Figure 7:
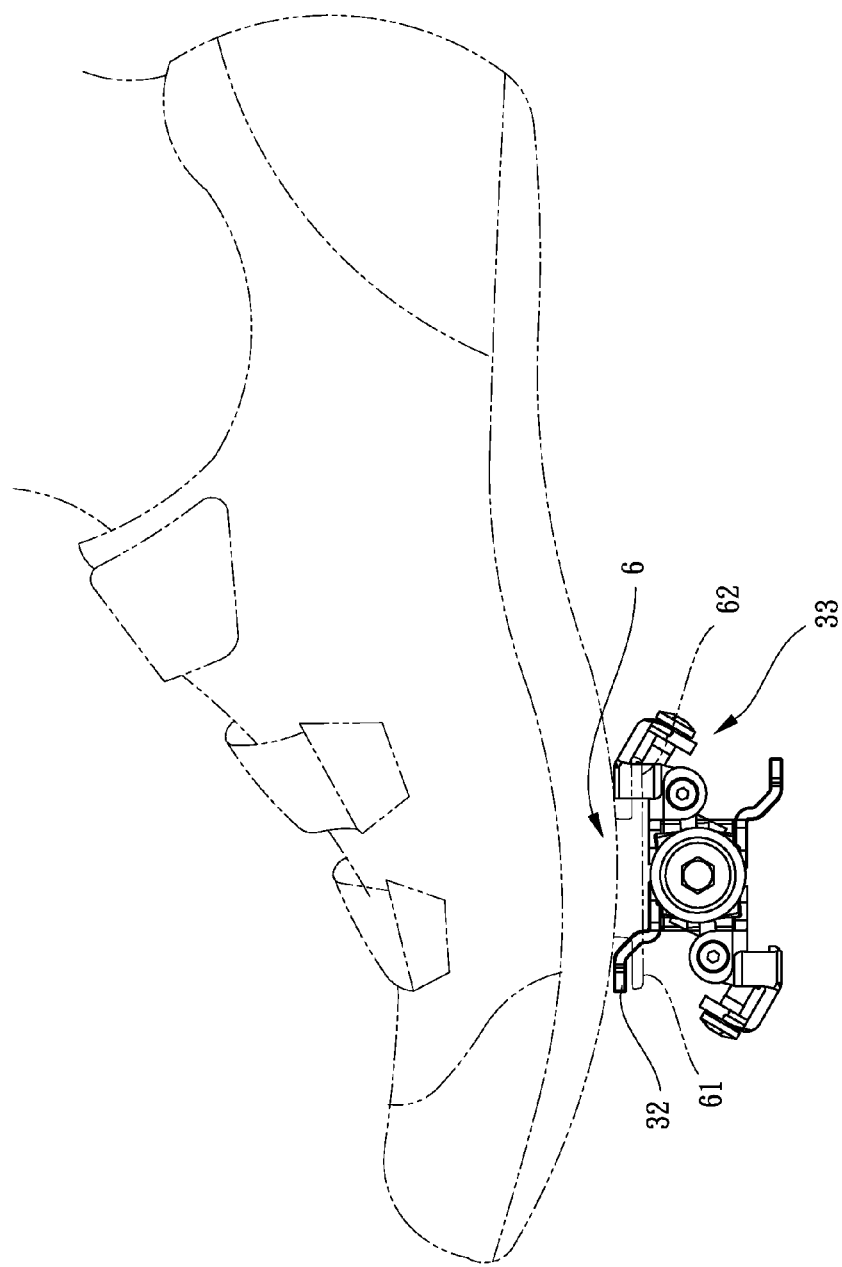
FIG. 7 is a side view for showing the front buckle of the shoe which is engaged with the engaging member, and a rare buckle of the shoe which is engaged with the fastening member.

Referring to FIGS. 6-7, a buckling member 6 is defined at a bottom of each shoe (not numbered) for a bicycle rider to fasten each shoe with the present invention. The buckling member 6 comprises a front buckle 61 and a rear buckle 62. When the bicycle rider wants to fasten each shoe with the present invention, firstly the front buckle 61 of the shoe is inserted into the receiving space 321 formed between the corresponding engaging member 32 and the pedal body 2; then the bicycle rider treads on the pedal body 2; as a result, the rear buckle 62 of the shoe is buckled between the two fastening portions 332 and the adjusting portion 331 so as to engage with the fastening member 33. Therefore, the shoes of the bicycle rider are stably fastened by the present invention, so that legs of the bicycle rider wouldn't unexpectedly depart from the pedal body 2.

Referring to FIGS. 3-5, each locking member 23, 24 has an arc concaved face 26 formed at one side thereof. Each arc concaved face 26 corresponds to each corresponding two torsion springs 341 so as to receive the two said torsion springs 341. Each arc concaved face 26 has two engaging grooves 261 defined at two sides thereof. The two outer sides of each two torsion springs 341 are both located into each corresponding engaging groove 261, so that each two torsion springs 341 are both positioned.

Referring to FIGS. 3-5, each adjusting portion 331 comprises an adjusting unit 3311 and a locking unit 3312. Each locking unit 3312 is extended downwardly from one side of each corresponding adjusting unit 3311. Each two fastening portions 332 are formed at the two sides of each corresponding adjusting unit 3311 respectively. Each two fastening portions 332 are both parallel to each corresponding locking unit 3312. Each adjusting unit 3311 has a switching groove 3313 opened therethrough. Each locking unit 3312 has a through hole 3314 opened thereon.

Each abutting member 342 comprises an abutting portion 3421. Each abutting portion 3421 has an extruded block 3422 protruded from a top thereof. Each extruded block 3422 is slidably assembled into each corresponding switching groove 3313. Each abutting portion 3421 is abutted against the two inner sides of each corresponding two torsion springs 341. Each abutting portion 3421 has a threaded hole 3423 opened therethrough. Under this arrangement, the adjustable bolt 343 passes through the through hole 3314 of the locking unit 3312 and the threaded hole 3423 of the abutting portion 3421 firstly; then, the adjustable bolt 343 is screwed into or out from the threaded hole 3423 of the abutting portion 3421 so as to adjust a distance between the abutting member 342 and the locking unit 3312 of the adjusting portion 331; as a result, the fastening member 33 is adjustable because of the abutting member 342 and the adjustable bolt 343 so as to fit each shoe; while a position of the extruded block 3422 relative to the switching groove 3313 is shown for the bicycle rider to know the tightness of the fastening member 33.

Figure 8:
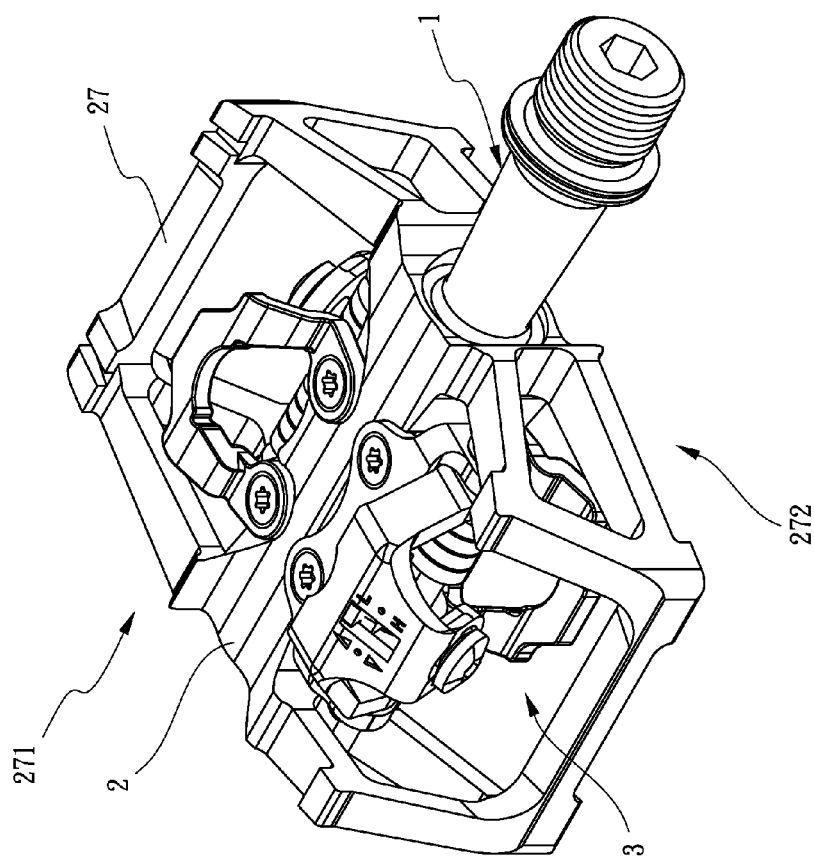
FIG. 8 is a perspective view of a second embodiment of the present invention.
Figure 9:
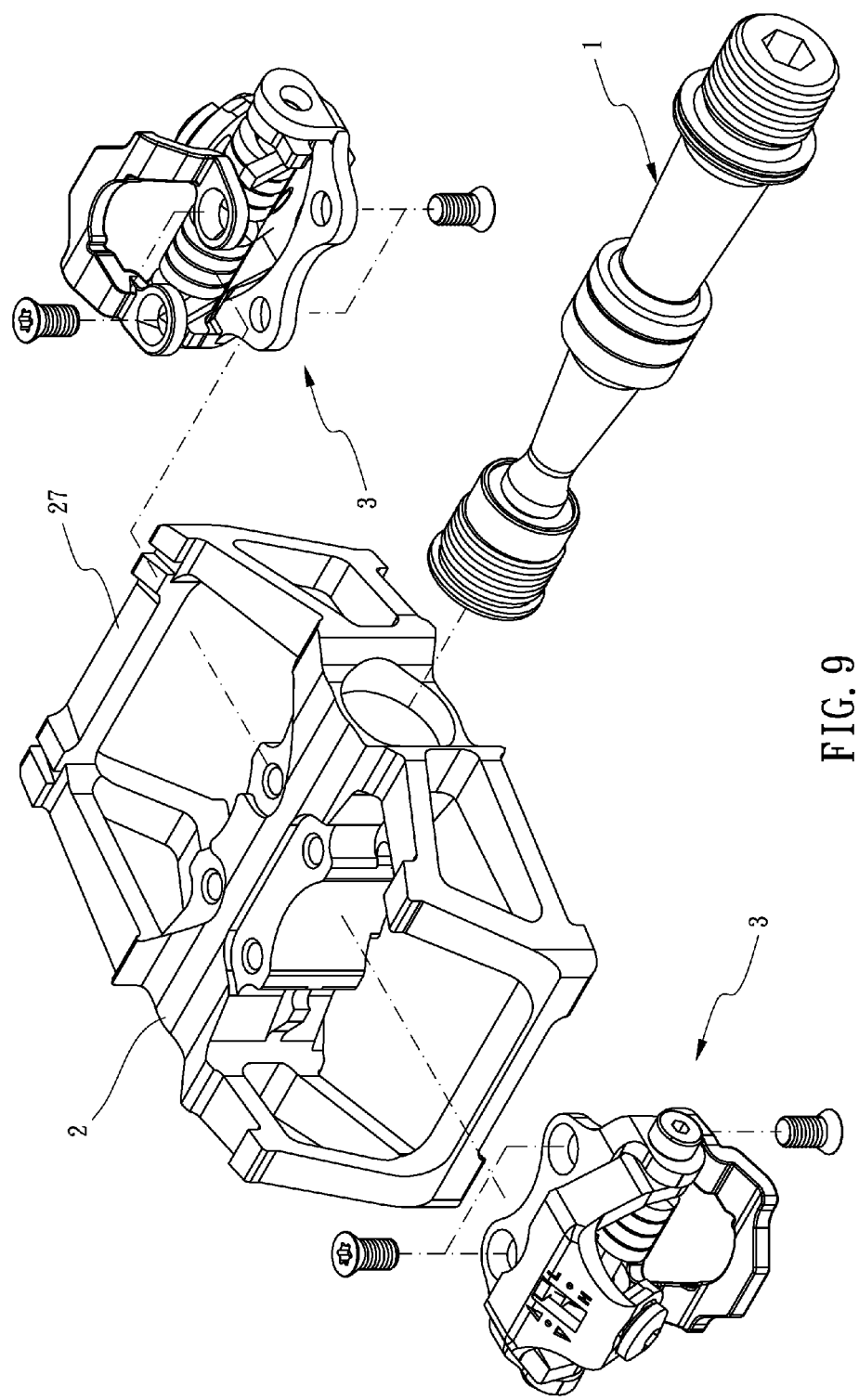
FIG. 9 is an exploded view of the second embodiment of the present invention.

Referring to FIGS. 8-9, a second embodiment of a pedal for a bicycle in accordance with the present invention is illustrated (Only the differences between the first embodiment and the second embodiment are further described.). The pedal body 2 has two side supports 27 extended therefrom. The two side supports 27 correspond to the first locking member 23 and the second locking member 24 respectively. The two side supports 27 and the upper portion 21 of the pedal body 2, and the two side supports 27 and the bottom portion 22 of the pedal body 2 define an upper contacting face 271 and a bottom contacting face 272 respectively for the bicycle rider to tread on stably. Each fastening assembly 3 is defined between each corresponding side support 27 and the pedal body 2. Under this arrangement, when the bicycle rider wants to ride the bicycle without an engagement from the fastening assemblies 3, the bicycle rider would directly tread on the upper contacting faces 271 of the side supports 27 of the pedal bodies 2; conversely, when the bicycle rider wants to ride the bicycle with the engagement from the fastening assemblies 3, the shoes of the bicycle rider would be engaged with the fastening assemblies 3 respectively so that the bicycle rider would tread on the pedal bodies 2 more stably.

Although the invention has been explained in relation to its preferred embodiment, it is to be understood that many other possible modifications and variations can be made without departing from the spirit and scope of the invention as hereinafter claimed.

What is claimed is:

1. A pedal for a bicycle comprising:
an axial rod;
a pedal body rotatably assembled to the axial rod, the pedal body defining a first locking portion and a second locking portion at two opposite sides, the first locking portion and the second locking portion each having two engaging grooves defined at a lateral side thereof;
two fastening devices respectively assembled to the pedal body, one of the two fastening devices assembled on a top plane of the first locking portion and the other fastening device assembled on a bottom plane of the second locking portion, each of the two fastening devices having a positioning member, a fastening member and a flexible controlling set, the positioning member assembled with the respective locking portion and having two protruded rings at two sides, the fastening member having an adjusting portion and two fastening portions connected with the two protruded rings of the positioning member by a spindle, the flexible controlling set having two torsion springs, an abutting member and an adjusting bolt, the two torsion springs mounted around the spindle between the two fastening portions of the fastening member, each of the two torsion springs having one end positioned in the respective engaging groove of the corresponding locking portion and the other end abutted by the abutting member, the adjusting bolt passing through the adjusting portion and being screwed into the abutting member to adjust strength of the two torsion springs; and
two engaging members respectively assembled to the pedal body, one of the two engaging members assembled on a bottom plane of the first locking portion and the other engaging member assembled on a top plane of the second locking portion, and each engaging member being substantially U-shaped so as to form a receiving space.

2. The pedal for a bicycle as claimed in claim 1, wherein two connecting grooves are defined at the top plane of the first locking portion and the bottom plane of the second locking portion respectively; the first and second locking portions each has an arc concaved face formed at one side thereof; and the arc concaved face corresponds to the two torsion springs.

3. The pedal for a bicycle as claimed in claim 2, wherein each connecting groove has a plurality of screwing holes defined in a bottom thereof; two spacing protrusions are defined at the bottom plane of the first locking portion and the top plane of the second locking portion respectively; and each spacing protrusion corresponds to the respective engaging member.

4. The pedal for a bicycle as claimed in claim 1, wherein each adjusting portion comprises an adjusting unit and a locking unit; each locking unit is extended downwardly from one side of each corresponding adjusting unit; each two fastening portions are formed at the two sides of each corresponding adjusting unit respectively; each two fastening portions are both parallel to each corresponding locking unit; each adjusting unit has a switching groove opened therethrough; each locking unit has a through hole opened thereon.

5. The pedal for a bicycle as claimed in claim 4, wherein each abutting member comprises an abutting portion; each abutting portion has an extruded block protruded from a top thereof; each abutting portion is abutted against two inner sides of each corresponding two torsion springs; each abutting portion has a threaded hole opened therethrough; the adjustable bolt passes through the through hole of the locking unit and the threaded hole of the abutting portion so as to adjust a distance between the abutting member and the locking unit of the adjusting portion so that the fastening member is adjustable; each extruded block is slidably assembled in to each corresponding switching groove.

6. The pedal for a bicycle as claimed in claim 1, wherein the pedal body has two side supports extended therefrom; the two side supports correspond to the first locking portion and the second locking portion respectively; the two side supports and an upper portion of the pedal body, and the two side supports and a bottom portion of the pedal body define an upper contacting face and a bottom contacting face respectively for the bicycle rider to tread on stably.

\* \* \* \* \*